(12) United States Patent
Brazeau

(10) Patent No.: US 10,048,060 B1
(45) Date of Patent: Aug. 14, 2018

(54) TECHNIQUES FOR MOTION TRACKING

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 15/185,728

(22) Filed: Jun. 17, 2016

(51) Int. Cl.
*G01B 11/14* (2006.01)
*G01B 17/00* (2006.01)

(52) U.S. Cl.
CPC .............. *G01B 11/14* (2013.01); *G01B 17/00* (2013.01)

(58) Field of Classification Search
CPC ................................ G01B 11/14; G01B 17/00
USPC .................................................. 356/614–640
See application file for complete search history.

(56) References Cited

U.S. PATENT DOCUMENTS 6,974,948 B1 * 12/2005 Brent .................... B65F 1/1638
250/221
2015/0185894 A1 * 7/2015 Chow .................. G01S 17/003
345/175

* cited by examiner

*Primary Examiner* — Tri T Ton
(74) *Attorney, Agent, or Firm* — Kilpatrick Townsend & Stockton LLP

(57) ABSTRACT

Systems and methods are provided herein for calculating an area of interaction within a perimeter of a detection area. A system may comprise a plurality of emitters, a plurality of sensors, a memory configured to store computer-executable instructions and a processor configured to access the memory and execute the instructions. The instructions may cause the processor to generate a set of emissions with the plurality of emitters, obtain sensor information of the plurality of sensors, determine a set of sensors of the plurality of sensors that failed to detect an emission of the set of emissions, and calculate an area of interaction within the perimeter of the detection area based at least in part on the determined set of sensors.

20 Claims, 9 Drawing Sheets

TECHNIQUES FOR MOTION TRACKING

BACKGROUND

Modern inventory systems, such as those in mail order warehouses, supply chain distribution centers, airport luggage systems, and custom-order manufacturing facilities, face significant challenges tracking items held in inventory. As items are moved around, for example, within a mail order warehouse, the probability that the item will be lost or misplaced is increased. This presents a problem for the warehouse operator as the item may not be discoverable when needed (e.g., when the item is needed to fulfill an order). Accordingly, it may be desirable to track items as they are moved within the warehouse. Currently, motion detecting and tracking techniques may include the use of still or motion picture cameras in conjunction with image recognition techniques. However, these techniques provide a number of disadvantages. For example, the expense of the equipment needed alone (e.g., video cameras, systems to analyze the images) may be cost prohibitive to implement. Additionally, analyzing large amounts of images may require extensive computing power. Further, utilizing image recognition techniques for tracking objects in three-dimensional space may prove inaccurate in some circumstances, such as in environments with many fast-moving objects.

Other techniques for determining a location of an item may utilize Light Detection And Ranging (LIDAR) techniques. Such techniques measure distance to an object by illuminating a target with a laser light signal and calculating distances by measuring the time for the signal to return. These techniques, however, are susceptible to inaccuracy if the object surface absorbs a broad range of the light spectrum as would be the case with an object that was covered in black felt. Similarly, inaccuracies would occur if the object surface is too reflective, as would be the case with an object with a mirror-like surface.

BRIEF DESCRIPTION OF THE DRAWINGS

Various embodiments in accordance with the present disclosure will be described with reference to the drawings, in which.

DETAILED DESCRIPTION

Figure 1:
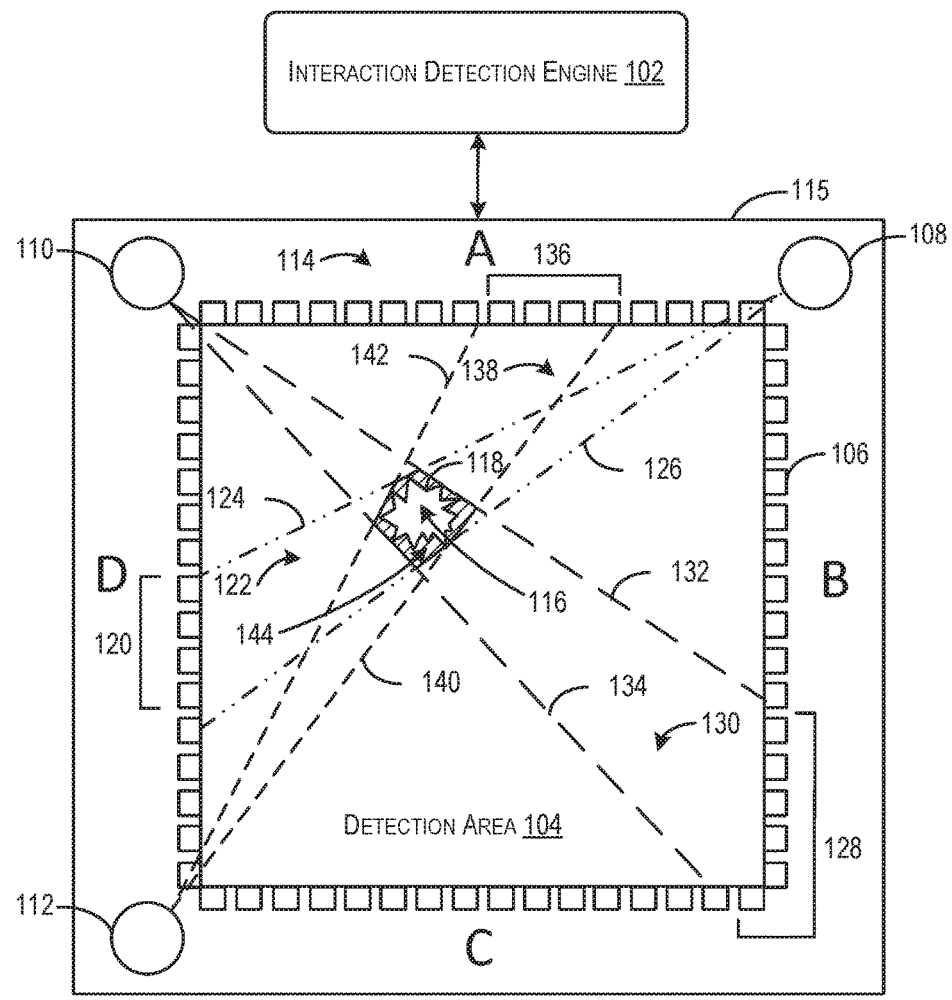
FIG. 1 is a schematic diagram illustrating an example environment suitable for implementing aspects of an interaction detection engine, in accordance with at least one embodiment.

Techniques described herein are directed to determining an area of interaction within a perimeter utilizing an interaction detection engine. Although examples throughout may utilize warehouses and/or warehouse machinery for illustrative purposes, it should be appreciated that any example herein may be equally applied to other suitable contexts.

In at least one embodiment, a number of sensors (e.g., photodiodes, photo resisters, microphones, etc.) may be positioned around a perimeter of an area (e.g., a bookcase, a storage unit, a door, etc.). Similarly, a number of emitters (e.g., light(s), speaker(s), or another suitable source of signals that the sensors are configured to detect) may be arranged around the perimeter. As a non-limiting example, the sensors and emitters (e.g., light sources) may be arranged around a storage area such as a bin (e.g., a shelf in a larger storage area) or pod (e.g., a storage area containing a number of smaller storage areas, such as a number of bins) that is used for storage in a warehouse. The interaction detection engine may consecutively trigger the light sources such that each light source emits light for a particular period of time. In at least one example, repeated triggering of the light emitters may, in effect, create a plane of light (e.g., a light curtain) within the perimeter. Sensor readings may be collected by the interaction detection engine in order to determine when an interaction has occurred, as well as a location of the interaction within the perimeter.

For example, as an item is placed on a shelf of a storage pod, a portion of the item, or a part of the placer (e.g., a person's hand, a robotic arm, etc.) may pass through a detection area that is defined by the perimeter and/or by the sensor arrangement. In at least one embodiment, the interaction detection engine may determine that one or more sensors failed to sense a light emission from a corresponding source. In an illustrative example, the perimeter may include three light sources and 20 sensors. As the item is being placed, a "shadow" may be cast by the item, blocking the light from one or more sources from reaching one or more sensors. The interaction detection engine may determine which sensors were unable to sense each light emission and may utilize such information to calculate an area within which an interaction occurred. In the ongoing example, the interaction detection engine may calculate from the sensor data, a location corresponding to a storage location (e.g., a position on a storage shelf). Accordingly, the interaction detection engine may store such information in a data store and/or may provide such information to another system for processing.

As another non-limiting example, a user in a warehouse may obtain a list of items to store. Such a list may be communicated to the user via a user device (e.g., a scanner, a mobile phone, or another suitable device capable of sending and receiving data). The list may indicate a number of storage locations in which to store a number of items in inventory. The user may travel through the warehouse to a first location indicated in the list. The first location may correspond to a particular storage location (e.g., a particular bin within the warehouse). Upon reaching the bin, the user may utilize an input device (e.g., a hand-held scanner, a bar-code scanner affixed to the bin, a scanner located within a threshold distance of the bin, a keypad, or the like) to provide an item identifier. The item identifier may be received by, for example, the interaction detection engine. The user may then place the item within the bin. As the item is placed in the bin, the item and/or a portion of the user (e.g., the user's hand/forearm) may pass through a detection area (e.g., defined by a perimeter including a number of sensors and emitters). Various emitters may emit, for example, light emissions that are configured to be sensed by a number of sensors. The interaction detection engine may determine a set of sensors that were able to sense the light emissions. Similarly, the interaction detection engine may determine the sensors that failed to sense the light emissions using the total set of sensors and the set of sensors that were able to sense the light emissions. By determining the sensors that were unable to sense the light emissions, the interaction detection engine may determine a "shadow" area corresponding to where the item (and/or user's hand/forearm) blocked the light emissions from one or more emitters from reaching one or more sensors. The interaction detection engine may perform this analysis any suitable number of times corresponding to any suitable number of emitters included within the detection area. Once the shadow areas are calculated for each light emission, the interaction detection engine may determine an area of interaction within the detection area corresponding to an intersection of the shadow areas. The interaction detection engine may, in some examples, store the storage location as an association with the item (e.g., as part of an item record).

It should be understood that in at least one example, an item identifier is not required. For example, the interaction detection engine may receive a list of items, the items may individually have a number of attributes (e.g., dimensions such as height, width, length, outer material composition (metal, plastic, etc.), etc.). In at least one embodiment, a number of sensor readings may be collected over a time period (e.g., 2 seconds, 3 seconds, 4 milliseconds, or any suitable time period) by the interaction detection engine. Each sensor reading may be used to calculate a corresponding area of interaction. Interactions occurring within the detection area and the time period may be deemed to be associated with a single item. Accordingly, the interaction detection engine may determine a largest area of interaction of the calculated areas of interaction. The largest area of interaction may be utilized by the interaction detection engine to approximate a size and/or shape of an item passing through the detection area. The approximated size/shape may be compared to the attributes of the items included in the item list to determine an item from the list that most closely matches the approximated size/shape. The interaction detection engine may determine that the item most closely matching the approximated size/shape corresponds to the item that has passed through the detection area. In at least one example, the interaction detection engine may store the calculated storage location as part of an item record associated with the item.

In accordance with at least one embodiment, a series of light planes (e.g., each corresponding to a number of detection areas) may be utilized by the interaction detection engine to determine a storage location. For example, a set of emitters (e.g., light sources) and a set of a light sensors may be arranged around a number of perimeters (e.g., 2 or more perimeters). Each light plane may be offset from the other light planes by some distance (e.g., 0.5 inches, 4 centimeters, or any suitable distance). Continuing with a similar example as described above, a person may place an item on a shelf of a storage area. As the item is placed, the item and portions of the person's body may break the various light planes. The interaction detection engine may utilize the sensor data from each set of sensors corresponding to each light plane in order to determine an area of interaction within each plane. For example, the person may be reaching upward to place an item on a top shelf of a storage unit. As a result, the person may break a first light plane at a relatively low position within the perimeter. The second light plane may be disrupted at a location that is relatively higher than the interaction location of the first light plane. Similarly, a third light plane may be disrupted at a location that is relative higher than the interaction location of the second light plane. The interaction detection engine, upon determining each interaction location corresponding to each light plane, may calculate an angle at which the approach occurred. For example, the interaction detection engine may determine that an object was placed on a particular shelf of a storage pod based, at least in part, on the location of the interaction as well as one or more angles determined from the individual interactions of the multiple light planes.

It should be appreciated that the techniques discussed above are applicable in contexts other than inventory situations. For example, a number of light sources may be arranged around a hallway, some distance (e.g., 5 feet) before a restricted access doorway (e.g., an electrical control room). Similarly, a number of sensors (e.g., photo resistors) may be similarly positioned. As a person walks toward the door and through the light plane, the person will cast a light shadow such that some number of sensors will be unable to sense light emissions from the light sources. The interaction detection engine may utilize the sensor data to determine when the person has walked through the light plane. Additionally, the interaction detection engine may determine a specific location at which the person walked through the light plane and/or a size/shape of the person. In at least one example, the interaction detection engine may determine that the person is over a particular height threshold (e.g., 48 inches) and the information may be provided by the interaction detection engine to a system responsible for operating the door. Because the person is over the particular height, the door may open. Whereas, if the person is determined to be shorter than the height threshold (e.g., a child who is 24 inches tall) the door may remain closed to prevent entry by unauthorized persons.

The techniques disclosed herein provide, at least, a cost-effective method for determining an area of interaction within a perimeter. Light sensors and/or microphones (in cases where sound emissions are utilized, may be more cost effective to implement than some motion detection/tracking techniques that utilize cameras. Additionally, calculations required to calculate an area of interaction may require less computing resources than systems that utilize image recognition techniques. Embodiments described herein may provide more accurate calculations than those produced using LIDAR techniques as the material of the object is less of a factor in the calculations used to determine an interaction area/location.

FIG. 1 is a schematic diagram illustrating an example environment 100 suitable for implementing aspects of an interaction detection engine 102, in accordance with at least one embodiment. For example, a detection area 104 (e.g., a light plane) may be configured using a number of sensors (e.g., sensor(s) 106) and a number of emitters (e.g., emitter 108, emitter 110, and emitter 112). A "sensor," as used herein, includes any suitable device that is capable of detecting an emission (e.g., light, sound, etc.). An "emitter," as used herein, may include devices that produce light, sound, etc. The sensors and emitters may be arranged around a perimeter 114 (the perimeter 114 includes side "A," side "B," side "C," and side "D"). In at least one example, the sensors and/or emitters may be arranged on a single plane (e.g., detection plane 115). It should be appreciated that the particular configuration depicted in FIG. 1 is illustrative in nature and that any suitable number of sensors and/or emitters may be utilized. The sensors may be arranged as depicted in FIG. 1, or the sensors may be spaced closer or further apart. Spacing between sensors may be uniform or variable. Similarly, the emitters utilized may be arranged as depicted in FIG. 1, or the emitters may be spaced closer or further apart with uniform or variable spacing between emitters. Although the detection area 104 in FIG. 1 is depicted as rectangular in shape, it should be appreciated that the detection area 104 may be differently shaped (e.g., having more or fewer sides than the detection area 104) depending on the perimeter 114.

In at least one embodiment, the interaction detection engine 102 is communicatively coupled with the sensor(s) 106 and the emitter 108, the emitter 110, and the emitter 112 (hereinafter "the emitters 108-112"). The interaction detection engine 102 may initiate emissions from the emitters 108-112 at any suitable time. The interaction detection engine 102 may receive sensor data from the sensor(s) 106 in response to initiating one or more emissions from the emitters 108-112. In at least one example, the light emissions may be triggered by the interaction detection engine 102 based at least in part on receipt of a triggering event (e.g., receipt of an item identifier from, for example, a user device).

In at least one embodiment, the interaction detection engine 102 may determine an area of interaction 116 constituting an approximate location at which an object has passed through the detection area 104. As a non-limiting example, three light sources (e.g., the emitters 108-112) may be arranged around the perimeter 114. In the example depicted in FIG. 1, sixty-four light sensors may be arranged around the perimeter 114 in equal spacing. In at least one example, a mapping between a set of sensors and particular light emitters may be maintained (or otherwise accessible) by the interaction detection engine 102. For example, the mapping may indicate that sensors situated on side "C" and sensors situated on side "D" are individually configured to detect emissions initiated by the emitter 108. The mapping may further indicate that the sensors situated on side "B" and the sensors situated on side "C" are individually configured to detect emissions initiated by the emitter 110. The mapping may further indicate that the sensors situated on side "A" and sensors situated on side "B" are individually configured to detect emissions initiated by the emitter 112. In some examples, the emitters 108-112 each produce light associated with a different range of a light spectrum. Similarly, in some examples, sensors on side "A" may be individually configured to detect light in a range of a light spectrum that is the same, different or partially overlapping from a light range that is detectable by the sensors on the side "B," for example.

As a non-limiting example, the interaction detection engine 102 may initiate a light emission from each emitter depicted in FIG. 1. In at least one embodiment, each emitter emits a curtain of light that covers, at least a portion of the detection area 104. The light emissions from the emitters 108-112 may be initiated consecutively, for example, with an emission of emitter 108, followed by an emission by emitter 110, followed by an emission by emitter 112, although any order may be utilized. Each emission may occur for a same or different time period. In some examples, the emitter 108, the emitter 110, and the emitter 112 each emit a different frequency of light, the interaction detection engine 102 may initiate the light emission from each emitter substantially simultaneously.

In at least one embodiment, after causing each emitter on the perimeter 114 to emit light for some threshold period of time, the interaction detection engine 102 may obtain sensor data corresponding to each of the sensor(s) 106. In at least some examples, only sensor data corresponding to sensors that are associated with a particular emitter is obtained. In the ongoing example, the interaction detection engine 102 may obtain sensor data from the sensors on side "C" and side "D" at the time of the emission from the emitter 108. Similarly, the interaction detection engine 102 may obtain sensor data from the sensors on side "B" and side "C" at the time of the emission initiated from the emitter 110. Similarly, the interaction detection engine 102 may obtain sensor data from the sensors on side "A" and side "B" at the time of the emission initiated from the emitter 112.

In at least one embodiment, the interaction detection engine 102 may utilize the sensor data to determine a "shadow" cast by the object with respect to a particular emitter. For example, the object may be passing through the detection area 104 approximately at the area of interaction 116. The object may be shaped as indicated by outline 118. When the emitter 108 emits its light, a "shadow" may be cast over a set of sensors that are unable to detect the emission. In a non-limiting example, the sensor data (e.g., sensor data from sensors on the side "C" and sensors on the side "D") corresponding to the emission of emitter 108 may be used to determine which sensors detected the light (e.g., side "C" and "D" sensors excluding the sensors 120) and which sensors failed to detect the light (e.g., the sensors 120). In at least one example, a failure to detect an emission by a sensor may be determined when a sensor reading for the sensor is at or under a threshold value (e.g., 0.1 out of a 0-1 scale, 0.5 of a 0-2 scale, etc.). A first area 122 (e.g., an area between lines 124 and 126) may be determined by the interaction detection engine 102 based at least in part on the set of sensors that were determined to have failed to detect the light from the emitter 108.

In at least one example, the interaction detection engine 102 may cause an emission by the emitter 110. Following an emission by the emitter 110, sensor data may be obtained by the interaction detection engine 102 from the sensors of the side "B" and sensors of the side "C." In a non-limiting example, the interaction detection engine 102 may utilize such sensor data to determine which sensors detected the light (e.g., side "B" and "C" sensors excluding the sensors 128) and which sensors failed to detect the light (e.g., the sensors 128). A second area 130 (e.g., an area between lines 132 and 134) may be determined by the interaction detection engine 102 based at least in part on the set of sensors that were determined to have failed to detect the light from the emitter 110.

In at least one example, the interaction detection engine 102 may cause an emission by the emitter 112. Following an emission by the emitter 112, sensor data may be obtained by the interaction detection engine 102 from the sensors of the side "A" and sensors of the side "B." In a non-limiting example, the interaction detection engine 102 may utilize such sensor data to determine which sensors detected the light (e.g., side "A" and "B" sensors excluding the sensors 136) and which sensors failed to detect the light (e.g., the sensors 136). A third area 138 (e.g., an area between lines 140 and 142) may be determined by the interaction detection engine 102 based at least in part on the set of sensors that were determined to have failed to detect the light from the emitter 112.

In at least one example, the interaction detection engine 102 may calculate an approximate area of interaction (e.g., the shaded area 144) where the object passed through the detection area 104. For example, the approximate area of interaction may be calculated by the interaction detection engine 102 by calculating the intersection (e.g., an overlap) of the first area 122, the second area 130, and the third area 138.

In at least one embodiment, each sensor (e.g., sensor(s) 106) is individually associated with a sub-area. The sub-area may constitute a wedged-shaped area starting at a location of an emitter and ending at two end-points associated with the individual sensor. In at least one example, when a shadow is cast on one or more sensors, the interaction detection engine 102 may calculate the shadow area (e.g., the first area 122) by adding together the wedge-shaped areas corresponding to each of the sensors (e.g., the sensors 120). In at least one example, the wedge-shaped area may be defined and/or stored as part of a mapping maintained (or at least accessible) by the interaction detection engine 102.

In accordance with at least one embodiment, the interaction detection engine 102 may continuously monitor the detection area 104 for interactions. By continuously monitoring for interactions, the interaction detection engine 102 may determine a size and/or perimeter of an object passing through the detection area 104. For example, at time 1,the interaction detection engine 102 may determine an area of interaction corresponding to the shaded area 144. At time 2, the interaction detection engine 102 may determine that the area of interaction has increased (e.g., corresponding to an area larger than the shaded area 144). For example, a person (or machine) in a warehouse may be reaching through a light curtain (e.g., detection area 104) to retrieve an item in inventory being stored behind the detection area 104 (e.g., on a shelf or other suitable location within a storage pod). At time 1, the person may be reaching in with his hand. The interaction of the person's hand may correspond with the shaded area 144. Upon grasping the item, the person may pull the item through the detection area 104 at time 2.The interaction of the person's hand and the item may correspond with a larger area than the shaded area 144. In such examples, the interaction detection engine 102 may determine that the first interaction and the second interaction are related based, at least in part, on the first interaction and the second interaction occurring within a threshold period of time (e.g., 5 seconds). Accordingly, the interaction detection engine 102 may determine that an item was retrieved from a location corresponding to the shaded area 144 because the area of interaction started out smaller (e.g., a hand-sized area), remained substantially constant for a short period of time (e.g., 1-2 seconds as the person paused to grasp the item) and/or then increased to a size that is bigger than the initial size (e.g., corresponding to a size of a hand, in addition to the grasped item). Similarly, the interaction detection engine 102 may determine that the size of the item is approximately the same size as the largest area of interaction.

It should be appreciated that similar calculations may be made for an item that is being stored at the storage locations. In such examples, the item may pass through the detection area 104 (e.g., corresponding to an area larger than the shaded area 144). The person may release the item and remove his forearm/hand from the bin, causing the interaction detection engine to determine a smaller subsequent area of interaction (e.g., the shaded area 144). Such a determination may cause the interaction detection engine to determine that an item has been stored at the storage location. In some examples, storage information may be stored as an association with the item.

Figure 2:
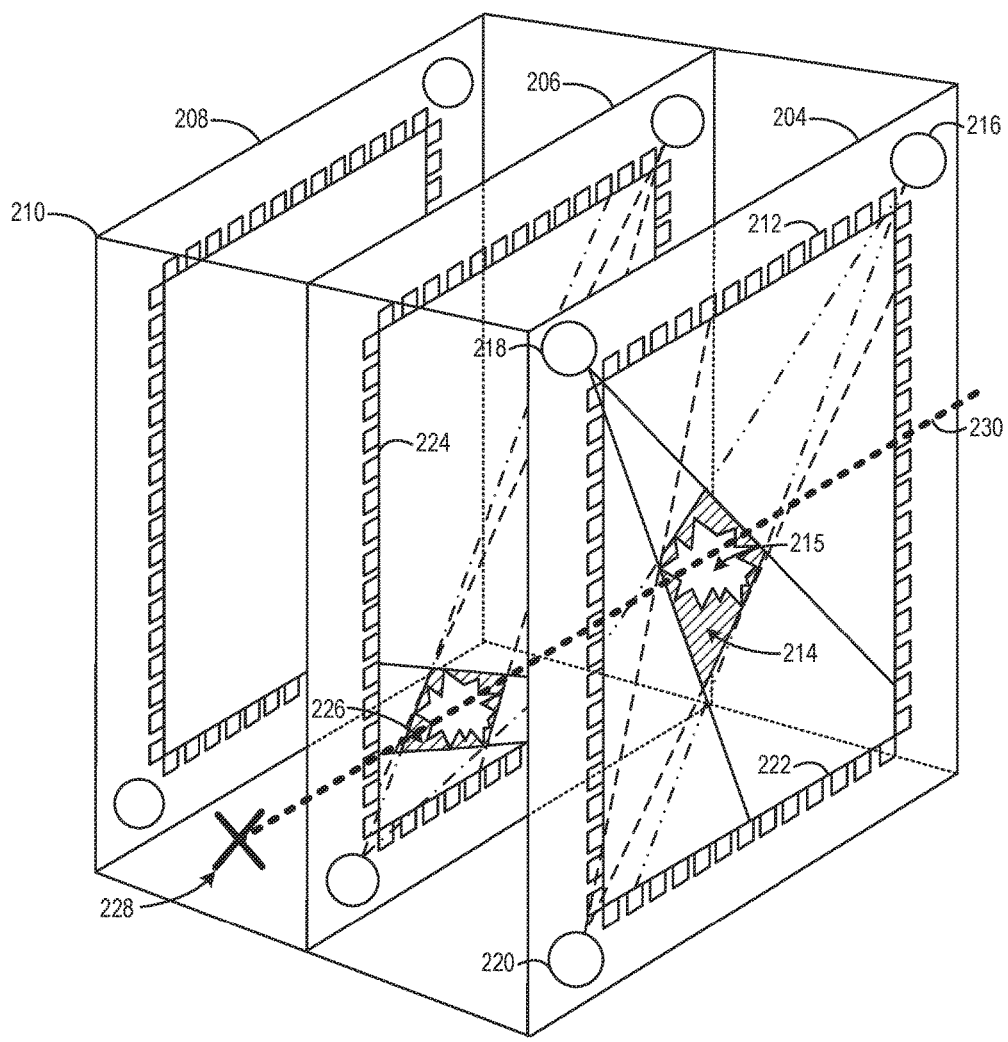
FIG. 2 is a schematic diagram suitable for implementing multiple detection areas that may be utilized by the interaction detection engine, in accordance with at least one embodiment.

FIG. 2 is a schematic diagram illustrating an example environment 200 suitable for implementing multiple detection areas that may be utilized by the interaction detection engine 102 of FIG. 1, in accordance with at least one embodiment. For example, a number of detection areas (each corresponding to a detection plane 204, a detection plane 206, and/or a detection plane 208) may individually correspond to a detection area (e.g., the detection area 104 of FIG. 1). Each detection plane may include one or more emitters (e.g., light emitters, sound emitters, etc.) in the configurations depicted in FIG. 2, or in a different configuration than depicted in FIG. 2. In some examples, a greater or lesser number of emitters may be included in each detection plane. The emitters may be situated at equal distances apart or the distances between the emitters may vary. The detection plane 204, the detection plane 206, and the detection plane 208 may be positioned within an area 210. The distance between adjacent detection planes may be uniform or the distance between adjacent detection planes may vary.

In at least one embodiment, the area 210 may be defined by walls of a storage unit (e.g., a bin, a storage pod, etc.). A "bin" may include a single storage area, whereas a "storage pod" may include multiple storage areas (e.g., multiple bins, shelves, slots and the like). Bins and storage pods may be discussed further in connection with FIGS. 3 and 4, respectively.

In accordance with at least one embodiment, the interaction detection engine 102 may be configured to generate emissions from each emitter residing on each detection plane. The interaction detection engine 102 may further be configured to receive sensor data from each sensor (e.g., such as sensor 212) residing on each detection plane.

In accordance with at least one embodiment, the interaction detection engine 102 may be configured to calculate a storage location of an item. For example, each detection plane (including a set of emitters, a set of sensors, and a detection area) may be utilized to calculate a corresponding area of interaction for an item in a similar manner as described in connection with FIG. 1. For example, the interaction detection engine 102 may calculate the area of interaction 214 using emitter 216, emitter 218, and emitter 220. Additional emitters may be utilized by the interaction detection engine 102, where each additional emitter increases the accuracy of the area of interaction 214 with respect to the actual interaction area 215 (e.g., the actual area where an object passes through a detection area associated with the detection plane). Thus, the number of emitters utilized may directly correspond with the accuracy of the area of interaction calculated by the interaction detection engine 102.

In the example depicted in FIG. 2, an object may pass through detection area 222 and detection area 224. The interaction detection engine 102 may determine the area of interaction 214 utilizing the emitter 216, the emitter 218, and/or the emitter 220. Similarly, the interaction detection engine 102 may determine the area of interaction 226 utilizing emitters associated with the detection plane 206. In some examples, the object may pass through all the provided detections areas. However, in the example given in FIG. 2, the object passes through only the detection area 222 and the detection area 224.

Utilizing the area of interaction 214 and the area of interaction 226, the interaction detection engine 102 may calculate a storage location 228. As an example, the interaction detection engine 102 may calculate a trajectory by utilizing the area of interaction 214 and the area of interaction 226. The trajectory calculated by the interaction detection engine 102 is depicted in FIG. 2 by line 230. The interaction detection engine 102, utilizing the trajectory, may determine that the interaction will occur between the object and the storage location 228 (e.g., that the object will be placed at the storage location 228.

The interaction detection engine 102 may utilize the size of the area of interaction 214 and the size of the area of interaction 226 to determine if an object is being placed, or alternatively, if an object is being retrieved. For example, the interaction detection engine 102 may determine that the areas of interaction (e.g., the area of interaction 214 and the area of interaction 226) are larger at a first time (e.g., time 1) than at a second time (e.g., time 2, time 2 being 0.4 seconds after time 1). Accordingly, the interaction detection engine 102 may recognize such information as being indicative of an object being placed at storage location 228. Similarly, the interaction detection engine 102 may determine that the areas of interaction (e.g., the area of interaction 214 and the area of interaction 226) are smaller at a first time (e.g., time 1) than at a second time (e.g., time 2, time 2 being 0.6 seconds after time 1). Accordingly, the interaction detection engine 102 may recognize such information as being indicative of an object being retrieved from the storage location 228.

In accordance with at least one embodiment, the interaction detection engine 102 may calculate a speed at which the object is being placed. For example, the interaction detection engine 102 may determine that at time 1, an object is passing through the detection area 222 (specifically at the area of interaction 214). At time 2, the interaction detection engine 102 may determine that an object is passing through the detection area 224 (specifically at the area of interaction 226). The interaction detection engine 102 may calculate a speed at which the object is being passed, utilizing a difference between time 1 and time 2, in addition to a known distance between the detection plane 204 and the detection plane 206.

Figure 3:
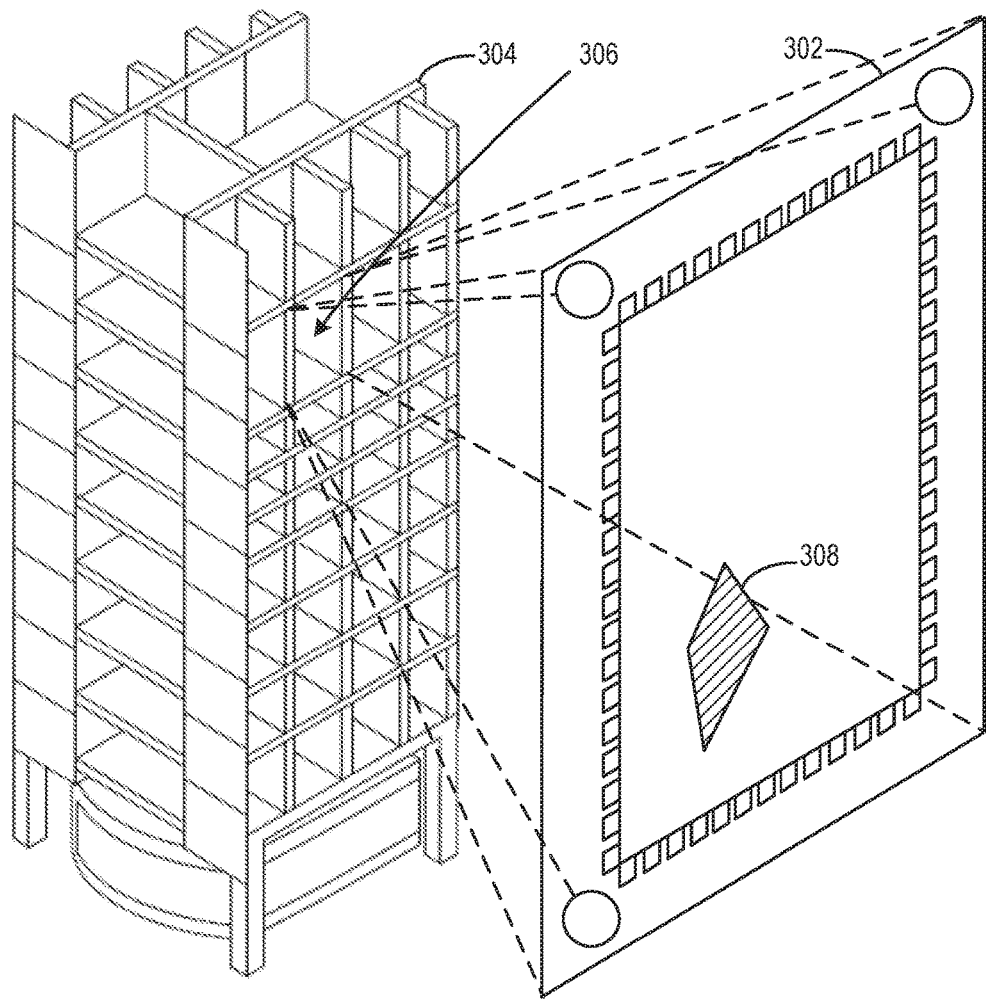
FIG. 3 is a schematic diagram illustrating an example environment suitable for implementing a detection area, in accordance with at least one embodiment.

FIG. 3 is a schematic diagram illustrating an example environment 300 suitable for implementing a detection plane 302 (e.g., the detection plane 115 of FIG. 1), in accordance with at least one embodiment. For example, a storage pod 304 is depicted in FIG. 3. The storage pod 304 includes a number of faces (e.g., 4, although only two are fully visible in FIG. 3). Each face of the storage pod 304 may include a number of storage bins, including, for example, bin 306. The bins included in the storage pod 304 may vary in size and shape from one another. In at least one example, each bin of the storage pod 304 may include a corresponding detection plane (e.g., the detection plane 302), or only a subset of the bins of the storage pod 304 may include a corresponding detection plane. In at least one embodiment, the emitters and sensors that create the detection plane 302 may be integrated within the storage pod 304.

In at least one embodiment, the detection plane 302 may be integrated as a standalone structure that is separate from the storage pod 304. As a non-limiting example, the detection plane 302 may be integrated as part of a standalone frame that is located in a warehouse. A storage pod (e.g., the storage pod 304) may be aligned adjacent to the standalone structure so as to utilize the detection plane 302. In such an example, a single detection plane such as the detection plane 302 may be utilized to ascertain interactions with any suitable number of storage pods.

In at least one embodiment, the detection plane 302 may be integrated as a standalone movable structure. For example, the detection plane 302 may be configured with a number of sensors and emitters arranged around a rectangular frame that may be mounted on a movable object (e.g., a robot, a forklift, etc.). In such examples, the detection plane 302 may be maneuvered to a position adjacent to a storage pod (e.g., the storage pod 304) when interaction detection of the storage pod is desired. In a warehouse scenario, it may be known that a person and/or robot is about to store an item in a particular storage pod (e.g., the storage pod 304). Accordingly, a movable detection plane (e.g., the detection plane 302) may be maneuvered such that it is positioned adjacent to the particular storage pod. When the item is stored, the detection plane 302 may be utilized to determine an area of interaction with respect to the particular storage pod.

In at least one non-limiting example, a detection plane that is integrated as part of a movable storage pod (e.g., the storage pod 304) and one or more movable/static detection planes may be utilized together. For example, the detection plane 302 may be integrated as part of the storage pod 304 as depicted in FIG. 3. In at least one example, the storage pod 304 may be positioned adjacent to one or more additional detection planes (e.g., a movable and/or static detection plane). The detection plane 302 and the one or more additional detection planes may be configured, for example, in a manner similar to the detection planes (e.g., the detection plane 204, the detection plane 206, and the detection plane 208 of FIG. 2) or another suitable configuration.

In accordance with at least one embodiment, the detection plane 302 may be offset from a storage location by some distance (e.g., 5 centimeters, 2 inches, etc.). The offset distance may be stored as part of the mapping utilized by the interaction detection engine 102. In at least one example, the offset may be utilized by the interaction detection engine 102 to calculate an angle of approach with respect to the detection plane 302 and the bin 306. As a non-limiting example, a person may reach above his head to place an item on a shelf located in a storage pod. In this situation, the person may interact with the detection plane 302 at a position that is lower than the location at which the item will eventually be placed. Accordingly, the interaction detection engine 102 may determine a location within the bin 306 that is based, at least in part, on both the area of interaction 308 and an offset associated with the detection plane 302.

In at least one embodiment, multiple detection planes may be utilized with the bin 306. For example, the detection planes of FIG. 2 may be utilized within the bin 306 to determine a trajectory, a speed, and/or a final location of an object being stored within the bin 306. Additionally, or alternatively, multiple detection planes within the bin 306 may be utilized by the interaction detection engine 102 to determine an object being retrieved from the bin 306. For example, an item may be associated with a particular storage location within the bin 306. The interaction detection engine 102 may calculate an area of interaction corresponding with each detection plane. A trajectory may be calculated based at least in part on the set of areas of interaction. The trajectory may be used to determine the initial storage location within the bin 306 at which an item was originally placed. The interaction detection engine 102 may determine an object that is associated with the location of the original placement. Further, the interaction detection engine 102 may update an object record to indicate that the object has been removed from the original storage location.

Figure 4:
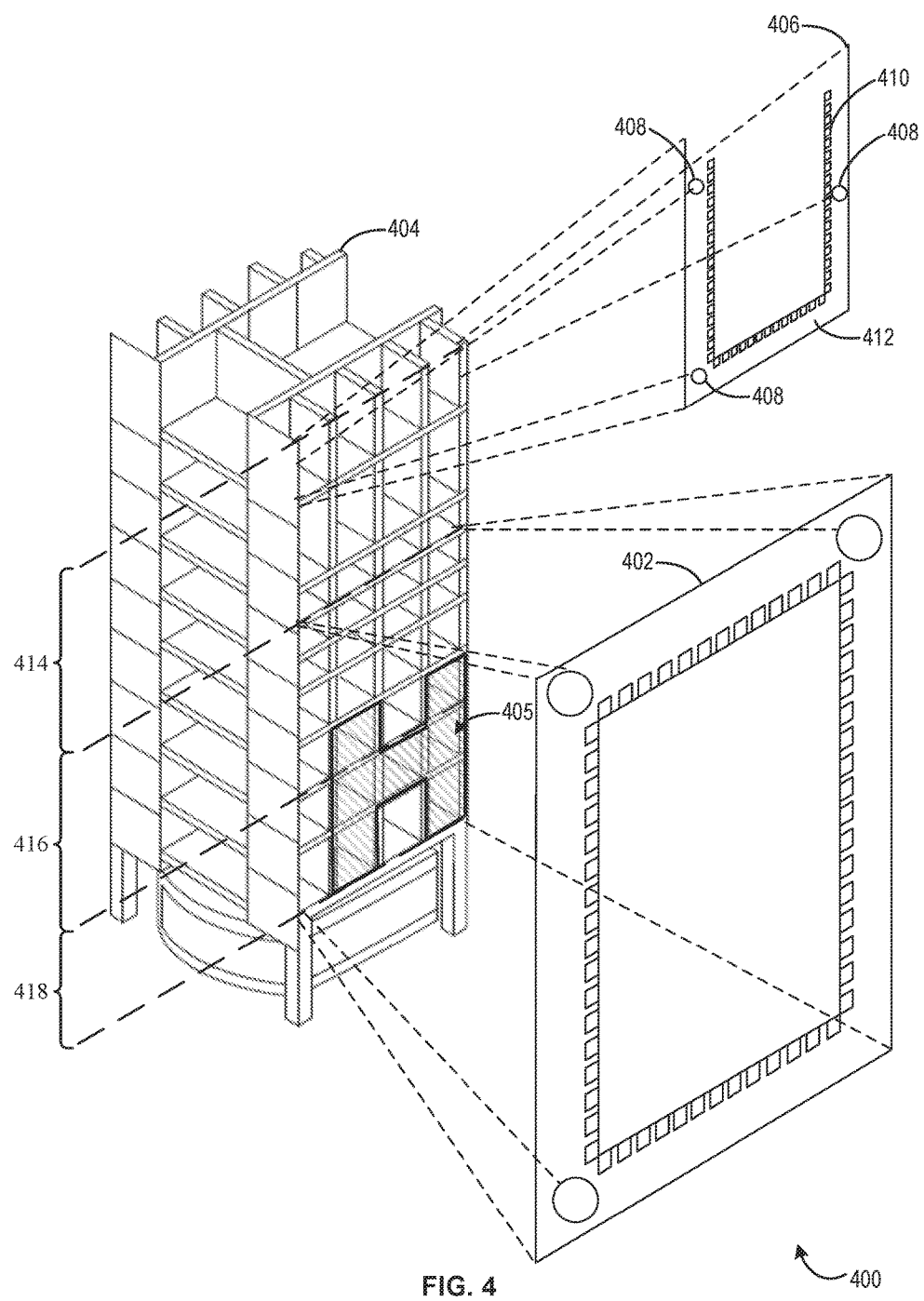
FIG. 4 is a schematic diagram illustrating another example environment suitable for implementing a detection plane, in accordance with at least one embodiment.

FIG. 4 is a schematic diagram illustrating another example environment 400 suitable for implementing a detection plane 402, in accordance with at least one embodiment. For example, the detection plane 402 may be configured to correspond to a whole, or at least a portion of, a face of a storage pod 404 (e.g., the storage pod 304 of FIG. 3). Although the detection plane 402 is rectangular, it should be appreciated that any number of bins included on a face of the storage pod 404 may be utilized so long as the bins are adjacent to one another. As another non-limiting example, the detection plane 402 may be configured as an "H" shape utilizing at least seven bins of a single face of the storage pod 404 such as the "H" shape depicted by shaded area 405. The shape of the detection plane 402 may vary depending on any number of factors, including the shape of an area for which interaction detection is desired.

It should be understood, that a perimeter of a detection plane (e.g., a detection plane 406) is not necessary required to fully encompass a particular area. For example, the bins located at the top of the storage pod 404 may not include a top edge. Accordingly, the detection plane 406 may include emitters 408 and sensors 410 configured on a three-sided perimeter 412. Although, the three-sided perimeter 412 does not entirely encompass the bins, storage locations may still be determined based, at least in part, on the emissions provided by the emitters 408 and sensor data collected by the sensors 410.

In accordance with at least one embodiment, the interaction detection engine 102 of FIG. 1 may be configured to apply a translation to a determined storage location based at least in part on the storage location's position with respect to a larger area (e.g., a face of the storage pod 404). In at least one example, a translation may cause a y-coordinate of a storage location to increase by a preset amount or a variable amount (e.g., increasing with increasing height of the storage locations). For example, the interaction detection engine 102 may be configured to apply a translation to storage locations determined to be included in area 414. Such translations, in some example, may cause a calculated storage location to be adjusted upward. This may be due to a predetermined understanding that as a person reaches upward (e.g., over their head) the area of interaction at which the item being placed breaks the detection plane (e.g., the detection plane 406) likely occurs at a lower position than where the item is eventually placed. This may be due to an assumption that a person reaching will have an approach from below of a particular angle.

Similarly, the interaction detection engine 102 may be configured to refrain from applying a translation, or the interaction detection engine 102 may be configured to apply a different translation for storage locations falling within the area 416. This may be due to an understanding that a person who places an item within the area 416 is likely approaching the storage location substantially orthogonal to the detection plane 402; thus the final storage location may be substantially the same as the area of interaction with the detection plane (e.g., the detection plane 402).

In accordance with at least one embodiment, the interaction detection engine 102 may be configured to apply a translation to storage locations determined to be included in area 418. Such translations, in some examples, may cause a calculated storage location to be adjusted downward. In at least one example, the translation may cause a y-coordinate of a storage location to be decreased by a preset amount or a variable amount (e.g., increasing with decreasing height of the storage locations. This may be due to a predetermined understanding that as a person reaches downward (e.g., below mid-thigh) the area of interaction at which the item being placed breaks the detection plane (e.g., the detection plane 402) likely occurs at a higher position than where the item is eventually placed. This may be due to an assumption that a person who is bending over to place an item will have an approach from above of a particular angle.

In at least one example, a method of translation (e.g., a mathematical formula associated with the area 414, the area 416, the area 418, or another suitable area) may be associated with a detection plane (e.g., the detection plane 402), for example, as part of a record associated with the detection plane 402. Upon determining a storage location, the interaction detection engine 102 may be configured to look up a translation associated with an area corresponding to the storage location. The interaction detection engine 102 may apply the translation and store the translated storage location for future use (e.g., in a record associated with the object being placed.

It should be appreciated that any suitable number of areas may be utilized with any suitable number of translations. Although FIG. 4 depicts three areas that are associated with three translations, more areas or fewer areas may be utilized, and the translations may be individually tailored to particular operators, e.g., based on their height or tendencies when reaching vertically. In addition, although FIG. 4 depicts three vertically separated areas that are associated with translations in the vertical direction, one or more horizontally separated areas may alternatively or additionally be associated with translations in the horizontal direction, e.g., relative to a vertical centerline of the storage pod, or additionally based on known standing or working locations of operators relative to the vertical centerline of the storage pod. These areas may be associated with common or different translations. In at least one example, an area may be associated with a translation identifier. Translations may be stored as a mapping of a translation identifier to a set of instructions for the translations. The interaction detection engine 102 may utilize the translation identifier to search for the translation. Upon finding the set of instructions corresponding to the translation identifier, the interaction detection engine 102 may cause the set of instructions to be executed, further causing the storage location to be translated according to the set of instructions.

Figure 5:
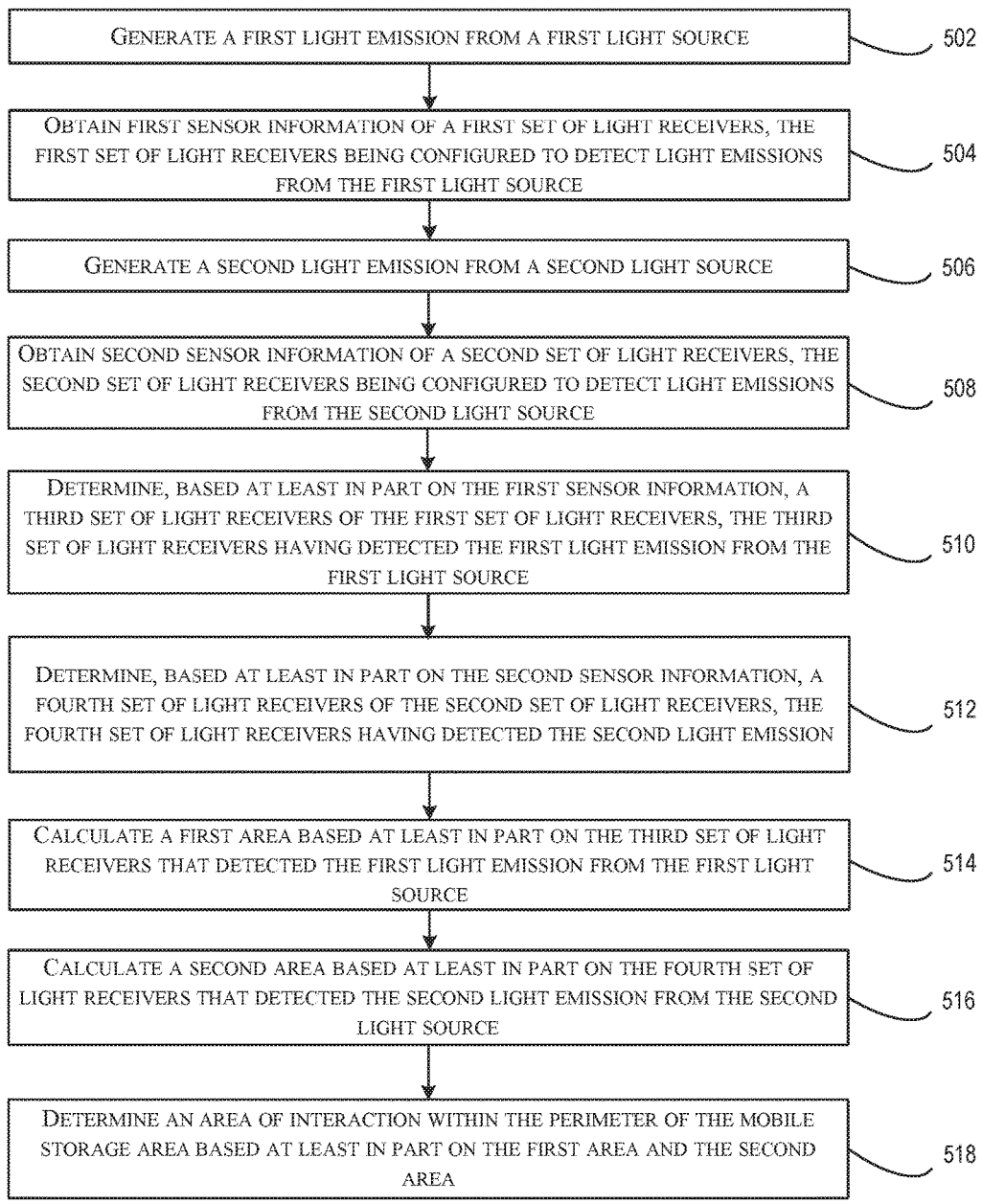
FIG. 5 is a flowchart illustrating an example method for determining an area of interaction within a perimeter of a mobile storage area, in accordance with at least one embodiment.

FIG. 5 is a flowchart illustrating an example method 500 for determining an area of interaction within the perimeter of the mobile storage area utilizing the interaction detection engine 102 of FIG. 1, in accordance with at least one embodiment. The method 500 may begin at block 502, where the interaction detection engine 102 generates a first light emission from a first light source (e.g., a light emitter such as the emitter 110 of FIG. 1), the first light source being arranged on a perimeter of a mobile storage area.

At block 504, the interaction detection engine 102 obtains first sensor information of a first set of light receivers (e.g., a set of light sensors). In at least one embodiment, the first set of light receivers may be configured to detect light emissions from the first light source. In at least one example, the interaction detection engine 102 may ascertain that the first set of light receivers are associated with the first light source according to a predetermined mapping.

At block 506, the interaction detection engine 102 generates a second light emission from a second light source (e.g., a light emitter such as the emitter 112 of FIG. 1). In at least one embodiment, the second light source may be arranged on the perimeter of the mobile storage area. In at least one embodiment, the second light source may be offset from the first light source. In accordance with at least one embodiment, the first light emission and the second light emission may occur substantially simultaneously (within a relatively short period of time, for example, an elapse of 2 nanoseconds between the two light emissions). In some examples, the first light emission comprises a different type or frequency of light (e.g., red light) than the second light emission (e.g., blue light).

At block 508, the interaction detection engine 102 obtains second sensor information of a second set of light receivers. In at least one embodiment, the second set of light receivers may be configured to detect light emissions from the second light source. In at least one example, the interaction detection engine 102 may ascertain that the second set of light receivers are associated with the second light source according to a predetermined mapping.

At block 510, the interaction detection engine 102 determines, based at least in part on the first sensor information, a third set of light receivers of the first set of light receivers. In at least one embodiment, the third set of light receivers may have detected the first light emission from the first light source. In at least one example, the interaction detection engine 102 may subtract the third set of light receivers from a number of the first set of light receivers associated with the first light source in order to determine a set of sensors that failed to detect the first light emission.

At block 512, the interaction detection engine 102 determines, based at least in part on the second sensor information, a fourth set of light receivers of the second set of light receivers. In at least one embodiment, the fourth set of light receivers may have detected the second light emission. In at least one example, the interaction detection engine 102 may subtract the fourth set of light receivers from a number of the second set of light receivers associated with the second light source in order to determine a set of sensors that failed to detect the second light emission.

At block 514, the interaction detection engine 102 calculates a first area based at least in part on the third set of light receivers that detected the first light emission from the first light source. In at least one embodiment, the interaction detection engine 102 may calculate the first area based at least in part on the set of sensors that failed to detect the first light emission from the first light source.

At block 516, the interaction detection engine 102 calculates a second area based at least in part on the fourth set of light receivers that detected the second light emission from the second light source. In at least one embodiment, the interaction detection engine 102 may calculate the second area based at least in part on the set of sensors that failed to detect the second light emission from the second light source.

At block 518, the interaction detection engine 102 determines an area of interaction within the perimeter of the mobile storage area based at least in part on the first area and the second area. In at least one embodiment, determining the area of interaction comprises calculating, by the interaction detection engine 102, an overlap of the first area and the second area. It should be understood that although only two light sources are utilized in the example provided, any number of light sources may be utilized. Each additional light source may increase an accuracy of the calculated area of interaction within the perimeter of the mobile storage area.

Figure 6:
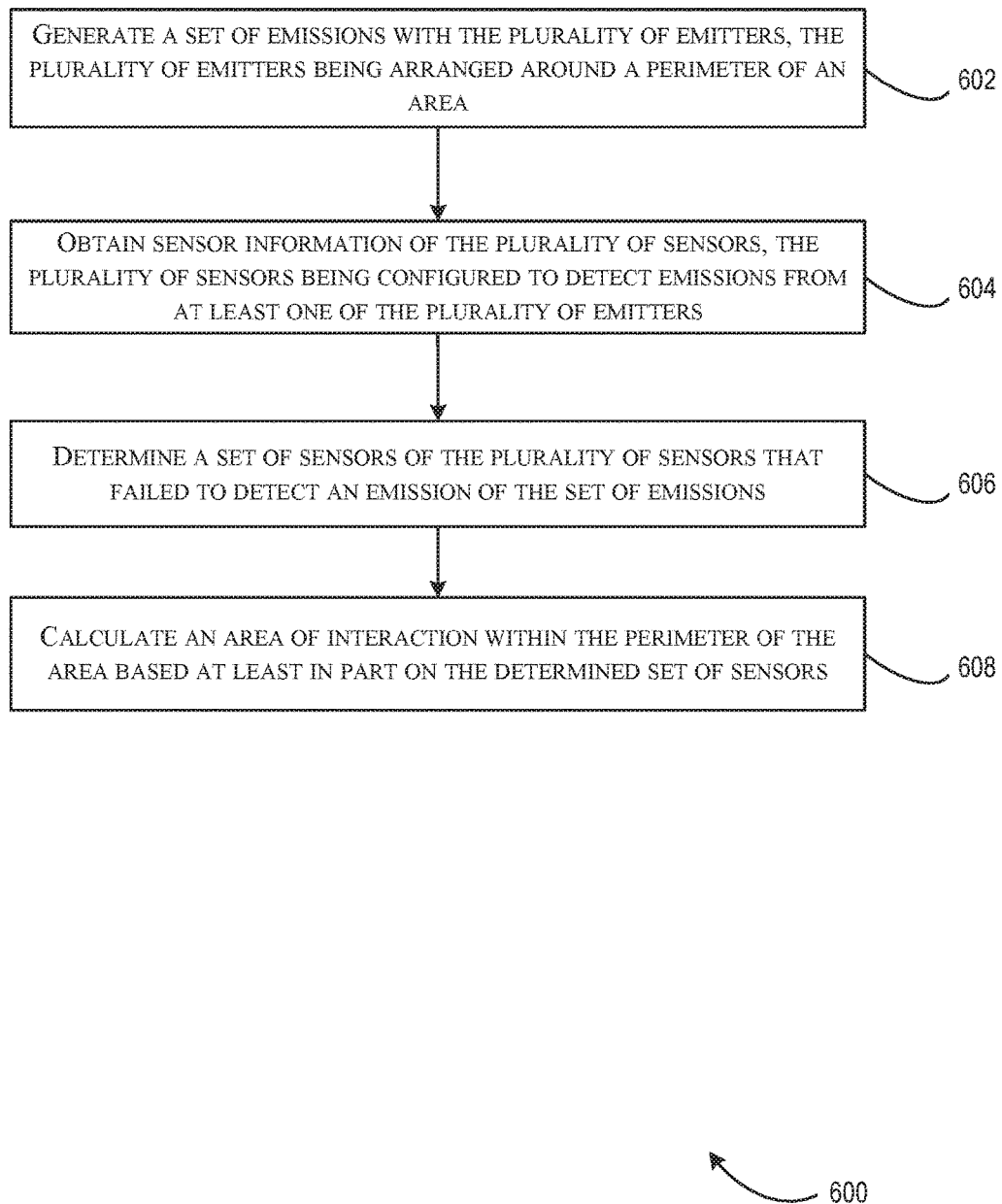
FIG. 6 is a flowchart illustrating an example method for calculating an area of interaction within a perimeter of an area, in accordance with at least one embodiment.

FIG. 6 is a flowchart illustrating another example method 600 for providing a number of interaction detections utilizing the interaction detection engine 102 of FIG. 1, in accordance with at least one embodiment. The method 600 may be performed by a system (e.g., the system 800 of FIG. 8) comprising a plurality of emitters, a plurality of sensors, a memory configured to store computer-executable instructions, and one or more processors configured to access the memory and execute the computer-executable instructions. The method 600 may begin at block 602, where the one or more processors generate a set of emissions with the plurality of emitters. In at least one embodiment, the plurality of emitters are arranged around a perimeter of a detection area. In at least one embodiment, the plurality of emitters individually emit at least one of a light or a sound.

At block 604, the one or more processors obtain sensor information of the plurality of sensors. In at least one embodiment, the plurality of sensors are configured to detect emissions from at least one of the plurality of emitters. In at least one embodiment, the instructions that obtain the sensor information of the plurality of sensors are executed in response to determining that at least one of the plurality of sensors failed to detect at least one emission of one or more of the plurality of emitters.

At block 606, the one or more processors determine a set of sensors of the plurality of sensors that failed to detect an emission of the set of emissions.

At block 608, the one or more processors calculate an area of interaction within the perimeter of the detection area based at least in part on the determined set of sensors. In at least one example, the area of interaction corresponds with a size of an item.

Figure 7:
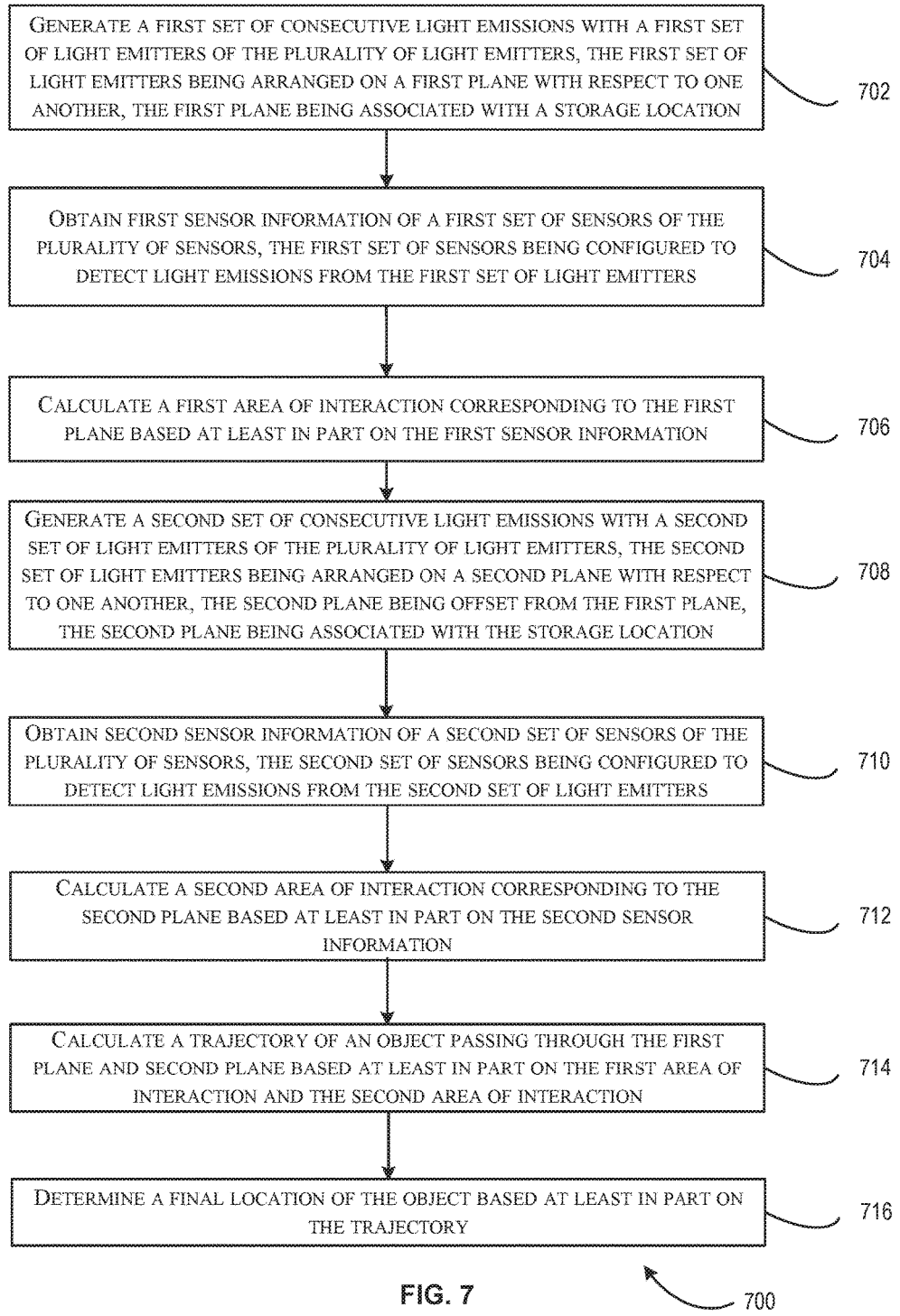
FIG. 7 is a flowchart illustrating an example method for determining a storage location of an item utilizing multiple detection areas corresponding to multiple planes, in accordance with at least one embodiment.

FIG. 7 is a flowchart illustrating still one further example method 700 for providing a number of interaction detections utilizing the interaction detection engine 102 of FIG. 1, in accordance with at least one embodiment. The method 700 may be performed by a system (e.g., the system 800 of FIG. 8) comprising a plurality of emitters, a plurality of sensors, a memory configured to store computer-executable instructions, and one or more processors configured to access the memory and execute the computer-executable instructions. The method 700 may begin at block 702, where one or more processors generate a first set of consecutive light emissions with a first set of light emitters of the plurality of light emitters. In at least one embodiment, the first set of light emitters are arranged on a first plane with respect to one another. In at least one embodiment, the first plane is associated with a storage location.

At block 704, the one or more processors obtain first sensor information of a first set of sensors of the plurality of sensors. In at least one embodiment, the first set of sensors are configured to detect light emissions from the first set of light emitters.

At block 706, the one or more processors calculate a first area of interaction corresponding to the first plane based at least in part on the first sensor information.

At block 708, the one or more processors generate a second set of consecutive light emissions with a second set of light emitters of the plurality of light emitters. In at least one embodiment, the second set of light emitters are arranged on a second plane with respect to one another. In at least one embodiment, the second plane is offset from the first plane. In at least one embodiment, the second plane is associated with the storage location.

At block 710, the one or more processors obtain second sensor information of a second set of sensors of the plurality of sensors. In at least one embodiment, the second set of sensors are configured to detect light emissions from the second set of light emitters.

At block 712, the one or more processors calculate a second area of interaction corresponding to the second plane based at least in part on the second sensor information.

At block 714, the one or more processors calculate a trajectory of an object passing through the first plane and second plane based at least in part on the first area of interaction and the second area of interaction.

At block 716, the one or more processors determine a final location of the object based at least in part on the trajectory.

Figure 8:
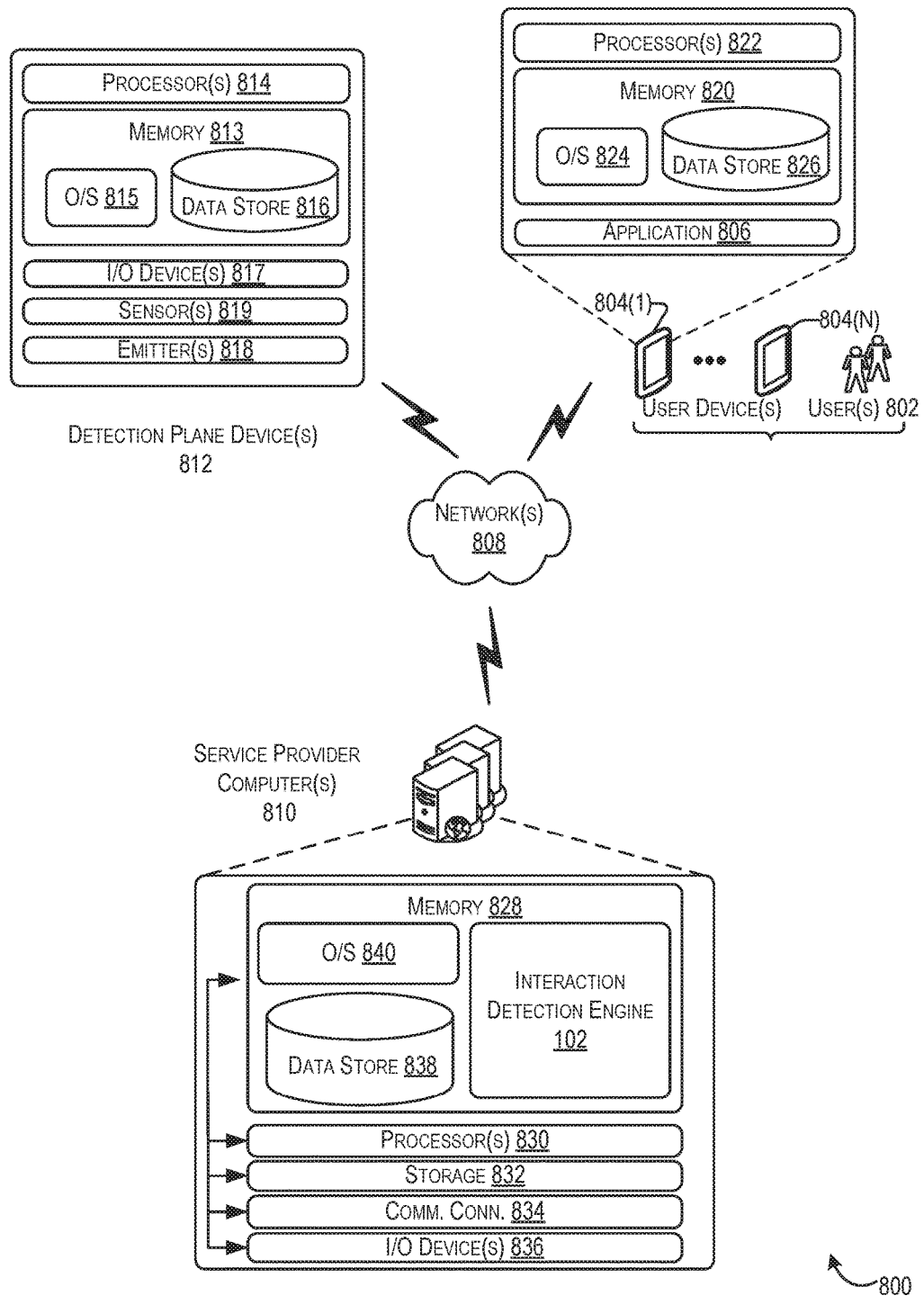
FIG. 8 is an example system including the interaction detection engine, in accordance with at least one embodiment.

FIG. 8 is an example system 800 including an interaction detection engine 102 (e.g., the interaction detection engine 102 of FIG. 1), in accordance with at least one embodiment. In system 800, one or more users 802 may utilize a user device (e.g., a user device of a collection of user devices 804(1)-(N) (collectively, user devices 804)) to provide an item identifier that is associated with an item (e.g., an item to be stored within a storage area such as a storage pod located in a warehouse). For example, the user may access a user interface accessible through an application 806 running on the user devices 804 via one or more networks 808. In some aspects, the application 806 operating on the user devices 804 may be hosted, managed, and/or provided by a computing resources service or service provider, such as by utilizing one or more service provider computers 810.

In some examples, the networks 808 may include any one or a combination of many different types of networks, such as cable networks, the Internet, wireless networks, cellular networks, and other private and/or public networks. While the illustrated example represents the users 802 accessing application functionality over the networks 808, the described techniques may equally apply in instances where the users 802 interact with the service provider computers 810 via the one or more user devices 804 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 806 may allow the users 802 to interact with the service provider computers 810 such as to provide an item identifier (e.g., an alphanumeric identifier corresponding to an item offered by an electronic marketplace provider, the alphanumeric identifier being unique to the item). In at least one example, the user devices 804 may include a hand-held device that includes a bar-code scanner. In such an example, the users 802 may utilize the user devices 804 to scan the barcode of an item to be stored or an item that has been retrieved. In another non-limiting example, a bar-code scanner (or other suitable identifier scanner) may be affixed to the storage location (e.g., a storage pod located in a warehouse). The users 802 may utilize the bar-code scanner affixed to the storage location in order to provide an identifier of the item. In cases where the user removes an item from a storage location (e.g., a bin) the user may be prompted (e.g., by the interaction detection engine 102) to provide an item identifier (e.g., by scanning the identifier, entering the identifier via touch-pad, or any suitable means of providing input including the item identifier).

In at least one embodiment, one or more detection plane devices (e.g., collectively, detection plane device(s) 812) may be provided (e.g., in a same or different configuration as described above in connection with FIGS. 1-4). In one illustrative configuration, the detection plane device(s) 812 may include at least one memory 813 and one or more processing units (or processor(s)) 814. The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described.

The memory 813 may store program instructions that are loadable and executable on the processor(s) 814, as well as data generated during the execution of these programs. The memory 813 may include an operating system 815, data store 816, and/or one or more application programs, modules, or services for implementing the features disclosed herein including one or more features of the interaction detection engine 102. Depending on the configuration and type of user computing device, the memory 813 may be volatile (such as random access memory (RAM)) and/or non-volatile (such as read-only memory (ROM), flash memory, etc.). In some implementations, the memory 813 may include multiple different types of memory, such as static random access memory (SRAM), dynamic random access memory (DRAM), or ROM.

Turning to the contents of the memory 813 in more detail, the memory 813 may include an operating system and one or more application programs, modules, or services for implementing the features disclosed herein. The detection plane device(s) 812 may be configured to receive (e.g., via I/O Device(s) 817 and/or via user device(s) 804), store (e.g., in data store 816), and/or display item information (e.g., via I/O Device(s) 817 and/or via user device(s) 804) associated with at least one item to be physically stored and/or retrieved. The I/O device(s) 817 may include a keyboard, a mouse, a pen, a voice input device, a touch input device, a display, speakers, a printer, or the like. Additionally, the memory 813 may store sensor readings associated with sensor(s) 819.

In accordance with at least one embodiment, the emitter(s) 818 may generate one or more emissions (e.g., a light, a sound, or the like). In situations in which the emitter(s) 818 are configured to produce light, the emitter(s) 818 may produce a number of light frequencies corresponding to range of color frequencies of a spectrum. In some examples, the emitter(s) 818 are configured to produce light of a particular frequency of the spectrum. Similarly, in examples in which the emitter(s) 818 produce sound, the sound may be provided on a number of frequencies and/or at a number of decibel ranges. It should be appreciated that light and/or sound emitters are used for illustrative purposes only and that any suitable emitter may be utilized by the interaction detection engine 102.

In accordance with at least one embodiment, the sensor(s) 819 may be configured to receive the generated one or more emission from the emitter(s) 818. Accordingly, the sensor(s) 819 may include light receivers (e.g., photo receivers, photodiodes, or the like) and/or sound receivers (e.g., microphones). The processor(s) 814 may store sensor readings from the sensor(s) 819 in the data store 816. Additionally, or alternatively, the processor(s) 814 may communicate the sensor readings to the service provider computer(s) 810 (e.g., via the network(s) 808).

The service provider computers 810, perhaps arranged in a cluster of servers or as a server farm, may host the application 806 operating on the user devices 804 and/or cloud-based software services. Other server architectures may also be used to host the application 806 and/or cloud-based software services. The application 806 operating on the user devices 804 may be capable of handling requests from the users 802 and serving, in response, various user interfaces that can be rendered at the user devices 804. The application 806 operating on the user devices 804 can present any suitable type of website that supports user interaction, including search engine sites. The described techniques can similarly be implemented outside of the application 806, such as with other applications running on the user devices 804.

The user devices 804 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user computing devices 804 may be in communication with the service provider computers 810 and/or the detection plane devices 812 via the networks 808, or via other network connections.

In one illustrative configuration, the user devices 804 may include at least one memory 820 and one or more processing units (or processor(s)) 822. The processor(s) 822 may be implemented as appropriate in hardware, computer-executable instructions, firmware, or combinations thereof. Computer-executable instruction or firmware implementations of the processor(s) 822 may include computer-executable or machine-executable instructions written in any suitable programming language to perform the various functions described.

The memory 820 may store program instructions that are loadable and executable on the processor(s) 822, as well as data generated during the execution of these programs. Depending on the configuration and type of user computing device, the memory 820 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 820 may include multiple different types of memory, such as static random access memory (SRAM), dynamic random access memory (DRAM), or ROM.

Turning to the contents of the memory 820 in more detail, the memory 820 may include an operating system 824 and one or more application programs, modules, or services for implementing the features disclosed herein, such as via the application 806 (e.g., a bar-code scanning application). The application 806 may be configured to receive, store, and/or display a network page or other interface for interacting with the service provider computers 810. Additionally, the memory 820 may store access credentials and/or other user information such as, but not limited to, user IDs, passwords, and/or other user information, e.g., in data store 826. In some examples, the user information may include information for authenticating an account access request such as, but not limited to, a device ID, a cookie, an IP address, a location, or the like.

In some aspects, the service provider computers 810 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 810 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 810 may be in communication with the user devices 804 and/or other service providers via the networks 808 or via other network connections. The service provider computers 810 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computers 810 may include at least one memory 828 and one or more processing units (or processor(s)) 830. The processor(s) 830 may be implemented as appropriate in hardware, computer-executable instructions, firmware, or combinations thereof. Computer-executable instruction or firmware implementations of the processor(s) 830 may include computer-executable or machine-executable instructions written in any suitable programming language to perform the various functions described.

The memory 828 may store program instructions that are loadable and executable on the processor(s) 830, as well as data generated during the execution of these programs. Depending on the configuration and type of service provider computers 810, the memory 828 may be volatile (such as RAM) and/or non-volatile (such as ROM, flash memory, etc.). The service provider computers 810 or servers may also include additional storage 832, which may include removable storage and/or non-removable storage. The additional storage 832 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 828 may include multiple different types of memory, such as SRAM, DRAM, or ROM.

The memory 828, the additional storage 832, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 828 and the additional storage 832 are all examples of computer storage media. Additional types of computer storage media that may be present in the service provider computers 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 810 may also contain communications connection(s) 834 that allow the service provider computers 810 to communicate with a stored database, another computing device or server, user terminals and/or other devices on the networks 808. The service provider computers 810 may also include I/O device(s) 836, such as a keyboard, a mouse, a pen, a voice input device, a touch input device, a display, speakers, a printer, etc.

Turning to the contents of the memory 828 in more detail, the memory 828 may include an operating system 840, data store 838, and/or one or more application programs, modules, or services for implementing the features disclosed herein, such as the features provided by the interaction detection engine 102.

In accordance with at least one embodiment, the interaction detection engine 102 may include a plurality of modules that may carry out various embodiments. The modules may be software modules, hardware modules, or a combination thereof. If the modules are software modules, the modules can be embodied on a computer readable medium and processed by a processor in any of the computer systems described herein. It should be noted that any module or data store described herein, may be, in some embodiments, a service responsible for managing data of the type required to make corresponding calculations. The modules may be exist as part of the interaction detection engine 102 operating on the service provider computer(s) 810, or the modules may exist as separate modules or services external to the service provider computer(s) 810 (e.g., as part of an interaction detection engine 102 operating on the detection plane device(s) 812. Any combination of modules associated with the interaction detection engine 102 may be executed, in whole or in part, on the service provider computers 810. Likewise, any combination of modules may be executed, in whole or in part, on the detection plane device(s) 812.

In the embodiment shown in the drawings, a user may utilize the user devices 804 and/or the I/O device(s) 817 to input an item identifier. For example, the user may utilize a scanner affixed and/or communicatively coupled to the detection plane device(s) 812. The scanner may, in some examples, read a bar-code associated with a particular item in inventory. Upon receiving the bar-code associated with the item, processor(s) 814 may cause the item identifier to be communicated to the interaction detection engine 102. Upon receipt of the item identifier, the interaction detection engine 102 may cause a number of emissions to be generated by the emitter(s) 818 in a manner similar to that described in the above figures. In at least one example, the interaction detection engine 102 may cause an indication to be presented (e.g., via the I/O device(s) 817 and/or the user device(s) 804) to the user indicating that, for example, the user is free to proceed with storing the item. The user may then store the item, where storing the item includes passing the item through a detection area (e.g., the detection area 104 of FIG. 1).

In at least one embodiment, the sensor(s) 819 may receive sensor data corresponding to the emissions generated by the emitter(s) 818. Upon receipt, or at some suitable time, the processor(s) 814 may cause the sensor data to be communicated to the interaction detection engine 102. In at least one example, the sensor data may additionally, or alternatively, be stored in the data store(s) 816, the data store 838, or another suitable storage location for future use.

Upon receipt of the sensor data, or at another suitable time, the interaction detection engine 102 may determine a set of sensors that were unable to detect a corresponding emission (e.g., during a time that the item was passing through the detection area 104). The interaction detection engine 102 may determine a number of shadow areas based, at least in part, on the determined set of sensors as described in connection with the figures above. An area of interaction may be calculated by the interaction detection engine 102. For example, the interaction detection engine 102 may consult a mapping (e.g., a mapping stored in the data store 838, the mapping including an association between a sensor and a shadow area). In one non-limiting example, the interaction detection engine 102 may determine that five sensors were unable to detect a light emission. The interaction detection engine 102 may determine five shadow areas corresponding to the five sensors based, at least in part, on the associations included in the mapping. The interaction detection engine 102 may calculate a shadow area of the object by calculating an intersection of the five shadows areas associated with the five sensors. In at least one example, the interaction detection engine 102 may store the calculated area of interaction as part of a historical record associated with the detection plane device(s) 812.

In at least one embodiment, the interaction detection engine 102 may determine a set of areas of interactions utilizing a set of sensor data collected at consecutive time frames (e.g., an area corresponding to sensor readings taken every 1 second) within a threshold period of time (e.g., 5 seconds). The interaction detection engine 102 may determine, using the areas of interaction: a size of the item, a shape of the item, a speed at which the item is travelling through one or more detection planes created by the sensor(s) 819 and the emitter(s) 818, an item from a list of items, a trajectory of the item with respect to a storage bin, or the like.

In at least one embodiment, the interaction detection engine 102 may filter the sensor data according to a set of sensors associated with a particular emitter. For example, it may be the case that each of the sensor(s) 819 collected readings during a time 1 during which a first emitter was generating an emission. In at least one example, the interaction detection engine 102 may cause the generation of the first emitter. The time of the generation may be logged (e.g., a part of historical record associated with a detection plane). Upon receipt of sensor data from time 1, the interaction detection engine 102 may consult a mapping (e.g., the mapping discussed above) to determine a set of sensors that are associated with the first emitter. Upon determining the set of sensors that are associated with the first emitter, the interaction detection engine 102 may filter sensor data that was not collected by the set of sensors from its calculations. In this manner, the number of computations required to compute a shadow area may be reduced as the interaction detection engine 102 may ignore unnecessary sensor data.

In at least one embodiment, the interaction detection engine 102 may filter the sensor data according a time of emission of a particular emitter. For example, it may be the case that each of the sensor(s) 819 collected readings during a time 1 during which a first emitter was generating an emission. It may be the case that an object passing through the detection area may produce a reflection or may otherwise delay the light from reaching the sensors within a particular time. In at least some examples, the interaction detection engine 102 may analyze sensor data within a threshold time period after time 1 (during which a first emitter was generating the emission) in order to determine that a sensor was able to sense the light emission (albeit later than expected).

In at least one example, the delay time (between emissions and/or the type of light sensed versus the type of light emitted) may be utilized by the interaction detection engine 102 to determine a material of the object. For example, a particular delay and/or a change in spectrum could indicate that the object is, at least partially, made up of a material that causes the emission to be sensed as a different light than the light emitted. In at least one example, such sensor information may be stored for later use. Additionally, or alternatively, such sensor information may be utilized by the interaction detection engine 102 to determine that a particular object is passing through the detection area. As a non-limiting example, an object (e.g., a prism) in a list of objects (e.g., objects to be physically stored) may pass through the detection area. As the object passes through the detection area, the light emitted may be changed by the object. Thus, the emitted light and the sensed light may be different. In at least one embodiment, the sensors may be configured to detect multiple types of lights. The interaction detection engine 102 may utilize the sensor data to determine that an object is passing through the detection area at a particular point, in the same manner as described above, even though the sensor data may indicate a different light sensed than the light emitted.

In at least one example, the interaction detection engine 102 may utilize information related to the material makeup of an object and/or dimensions/size of the object when determining where the object has interacted with the detection area. For example, an object (e.g., a piece of glass) may pass through the detection area. The light, in this example, may be bent (refracted) by the glass, causing the light to be detected by a different set sensors than the sensors that would have detected the light if the light had not been bent. The interaction detection engine 102, in at least one example, may utilize the material makeup of the object and/or size of the object to determine that the light has been refracted. Accordingly, the interaction detection engine 102 may calculate an accurate shadow area associated with an emitter and a set of sensors given the determination that the light was bent to some degree.

In at least one embodiment, the interaction detection engine 102 may calculate a size and/or shape of the item. For example, the detection plane device(s) 812 may form a detection plane approximately 5 feet from a mechanical door (e.g., leading to a restricted access or potentially hazardous area). The interaction detection engine 102 may cause a number of emitter(s) 818 to generate a number of emissions (e.g., on a cyclical or other periodic basis). An adult may pass through the detection plane. The interaction detection engine 102 may receive sensor data corresponding to the interaction of the adult with the detection plane. In a manner similar to that discussed above, utilizing shadow areas calculated by the interaction detection engine 102, the shadow areas being based, at least in part, on the sensor data collected as the adult passed through the detection plane, the interaction detection engine 102 may determine that the adult is approximately 62 inches in height. In at least one example, the interaction detection engine 102 may consult a threshold value (e.g., 48 inches, 52 inches, 36 inches, etc.) to determine a remedial action. For example, the interaction detection engine 102 may cause a door to be opened based at least in part on the determination that the height of the adult exceeds the threshold value. Similarly, a child may pass through the detection plane. Utilizing the techniques above, the interaction detection engine 102 may determine that the child is 34 inches in height and may cause the door to remain closed.

Figure 9:
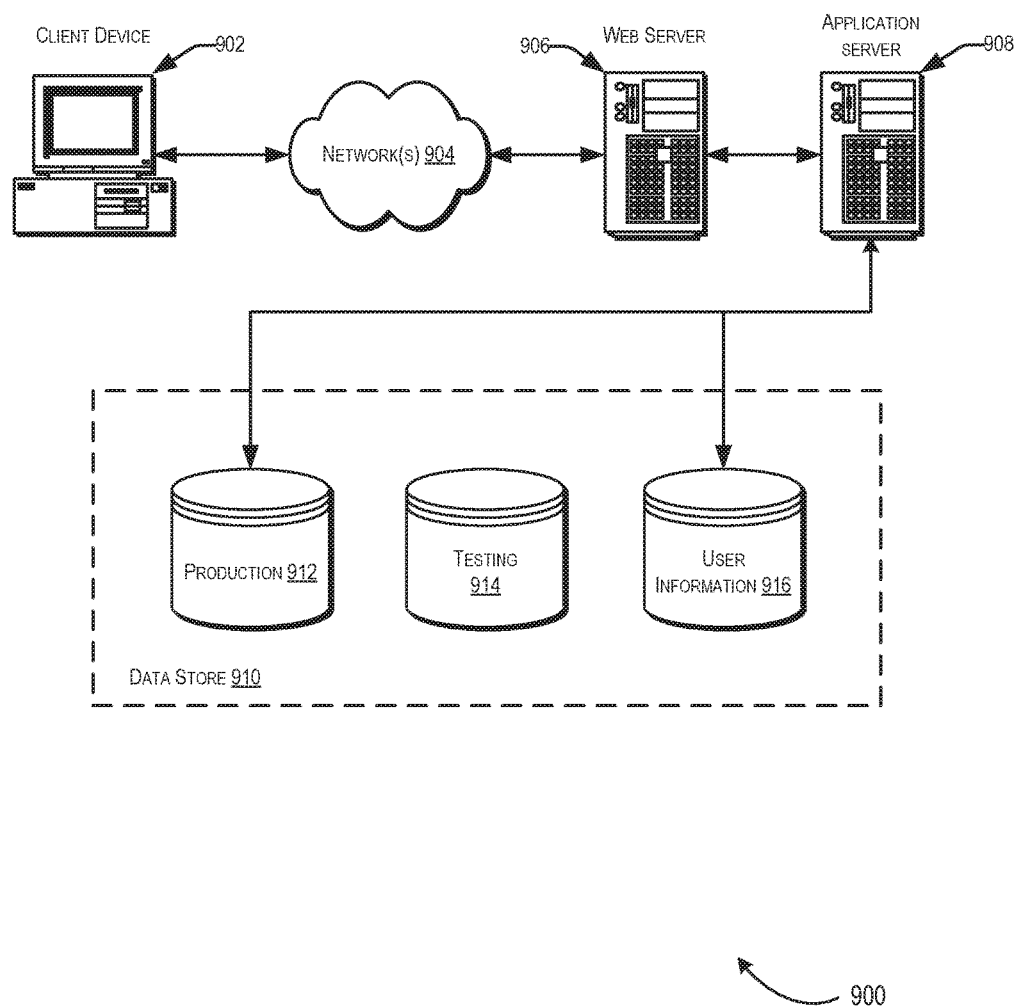
FIG. 9 is a schematic diagram illustrating an example environment for implementing aspects in accordance with at least one embodiment described herein.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   generating a first light emission from a first light emitter, the first light emitter being arranged on a perimeter of a detection area;
   obtaining first sensor information of a first set of light receivers, the first set of light receivers being configured to detect the first light emission from the first light emitter;
   generating a second light emission from a second light emitter, the second light emitter being arranged on the perimeter of the detection area, the second light emitter being offset from the first light emitter;
   obtaining second sensor information of a second set of light receivers, the second set of light receivers being configured to detect the second light emission from the second light emitter;
   calculating a first area based at least in part on the first sensor information, wherein the first sensor information indicates that at least one of the first set of light receivers failed to detect the first light emission from the first light emitter;
   calculating a second area based at least in part on the second sensor information, wherein the second sensor information indicates that at least one of the second set of light receivers failed to detect the second light emission from the second light emitter; and
   calculating an area of interaction within the perimeter of the detection area based at least in part on the first area and the second area.

2. The computer-implemented method of claim 1, wherein the first light emission and the second light emission occur at substantially a same time.

3. The computer-implemented method of claim 1, wherein the first light emission comprises a different type of light than the second light emission.

4. The computer-implemented method of claim 1, wherein determining the area of interaction comprises calculating an overlap of the first area and the second area.

5. A system, comprising:
   a plurality of light emitters;
   a plurality of light receivers;
   a memory configured to store computer-executable instructions; and a processor configured to access the plurality of light emitters, the plurality of light receivers, and the memory, and further configured to execute the computer-executable instructions to at least:
- generate a set of light emissions with the plurality of light emitters, the plurality of light emitters being arranged on a perimeter of a detection area;
- obtain sensor information of the plurality of light receivers, the plurality of light receivers individually being configured to detect a light emission from a corresponding light emitter of the plurality of light emitters;
- calculate a plurality of areas based at least in part on the sensor information of the plurality of light receivers, wherein the sensor information of the plurality of light receivers indicates a particular light receiver that failed to detect the light emission from the corresponding light emitter; and
- calculate an area of interaction within the perimeter of the detection area based at least in part on the plurality of areas.

6. The system of claim 5, wherein the sensor information of the plurality of light receivers indicates that at least one of the plurality of light receivers failed to detect at least one light emission of the plurality of light emitters.

7. The system of claim 5, wherein the plurality of light emitters individually emit different types of light.

8. The system of claim 5, wherein the area of interaction corresponds to a size of an item.

9. The system of claim 5, wherein the processor is further configured to execute the computer-executable instructions to at least:
- generate one or more additional sets of light emissions with the plurality of light emitters;
- obtain additional sensor information of the plurality of light receivers, the additional sensor information corresponding to the one or more additional sets of light emissions; and
- calculate one or more additional areas of interaction based at least in part the additional sensor information corresponding to the one or more additional sets of light emissions.

10. The system of claim 9, wherein the processor is further configured to execute the computer-executable instructions to at least:
- calculate at least one of a size or a shape of an item based at least in part on the area of interaction and the one or more additional areas of interaction.

11. The system of claim 5, wherein the processor is further configured to execute the computer-executable instructions to at least:
- determine an offset distance between the detection area and a storage area, the detection area being attached to the storage area; and
- calculate a storage location of an item within the storage area based at least in part on the offset distance and the area of interaction.

12. The system of claim 5, wherein the set of light emissions comprises a light curtain.

13. The system of claim 5, wherein executing the computer-executable instructions that obtain sensor information of the plurality of light receivers further causes the system to at least:
- obtain a mapping, the mapping comprising a first association between a first light emitter of the plurality of light emitters and a first set of light receivers of the plurality of light receivers, a second association between a second light emitter of the plurality of light emitters and a second set of light receivers of the plurality of light receivers; and
- based at least in part on the mapping:
  - obtain first sensor information corresponding to the first set of light receivers; and
  - obtain second sensor information corresponding to the second set of light receivers, wherein the sensor information comprises the first sensor information and the second sensor information.

14. The system of claim 13, wherein the plurality of areas comprises a first area associated with the first light emitter and a second area associated with the second light emitter.

15. The system of claim 14, wherein the area of interaction within the detection area is calculated based at least in part on an overlap of the first area and the second area.

16. A system, comprising:
- a plurality of light emitters;
- a plurality of light receivers;
- a memory configured to store computer-executable instructions; and
- a processor configured to access the plurality of light emitters, the plurality of light receivers, and the memory, and further configured to execute the computer-executable instructions to at least:
  - generate a first light emission with a first light emitter of the plurality of light emitters, the first light emitter being arranged on a perimeter of a detection area;
  - obtain first sensor information of a first set of light receivers of the plurality of light receivers, the first set of light receivers being configured to detect light emissions from the first light emitter;
  - calculate a first area based at least in part on the first sensor information, wherein the first sensor information indicates that at least one of the first set of light receivers failed to detect the first light emission from the first light emitter;
  - generate a second light emission with a second light emitter of the plurality of light emitters, the second light emitter being arranged on the perimeter of the detection area, the second light emitter being offset from the first light emitter;
- obtain second sensor information of a second set of light receivers of the plurality of light receivers, the second set of light receivers being configured to detect light emissions from the second light emitter;
- calculate a second area based at least in part on the second sensor information wherein the second sensor information indicates that at least one of the second set of light receivers failed to detect the second light emission from the second light emitter; and
- calculate an area of interaction within the perimeter of the detection area based at least in part on the first area and the second area.

17. The system of claim 16, wherein the first light emitter emits a different type of light than the second light emitter.

18. The system of claim 16, wherein the first area of interaction corresponds to a size of an item interacting with the detection area.

19. The system of claim 18, wherein the processor is further configured to execute the computer-executable instructions to at least:
- determine a final location of the item based at least in part on the area of interaction; and
- store the final location of the item in a record associated with the item.

20. The system of claim 16, wherein the processor is further configured to execute the computer-executable instructions to at least:
- receive item information associated with a plurality of items, wherein the first light emission is generated based at least in part on receipt of the item information;
- determine an approximate size of an object interacting with the detection area based at least in part on the area of interaction;
- compare the approximate size of the object to corresponding sizes of the plurality of items;
- identify, based at least in part on comparing the approximate size of the object to the corresponding sizes of the plurality of items, a particular item of the plurality of items, a corresponding size of the particular item being most similar to the approximate size of the object; and
- store an association between a storage location associated with the detection area and the object.

\* \* \* \* \*

UNITED STATES PATENT AND TRADEMARK OFFICE
CERTIFICATE OF CORRECTION

PATENT NO. : 10,048,060 B1
APPLICATION NO. : 15/185728
DATED : August 14, 2018
INVENTOR(S) : Jeremiah David Brazeau Page 1 of 1

It is certified that error appears in the above-identified patent and that said Letters Patent is hereby corrected as shown below:

In the Claims

Column 27, Line 40, Claim 9:
Delete: "at least in part the additional sensor information"
Insert: --at least in part on the additional sensor information--

Column 28, Line 58, Claim 18:
Delete: "first"

Signed and Sealed this
Fourth Day of December, 2018

Andrei Iancu
*Director of the United States Patent and Trademark Office*